(12) United States Patent
Cha (10) Patent No.: US 11,987,980 B2
(45) Date of Patent: May 21, 2024

(54) ANCHOR BOLT ASSEMBLY AND CEILING FINISHING PANEL FIXING APPARATUS COMPRISING SAME

(71) Applicant: Ju Byeong Cha, Seoul (KR)

(72) Inventor: Ju Byeong Cha, Seoul (KR)

( * ) Notice: Subject to any disclaimer, the term of this patent is extended or adjusted under 35 U.S.C. 154(b) by 446 days.

(21) Appl. No.: 17/291,439

(22) PCT Filed: Apr. 29, 2020

(86) PCT No.: PCT/KR2020/005687
§ 371 (c)(1),
(2) Date: May 5, 2021

(87) PCT Pub. No.: WO2020/222535
PCT Pub. Date: Nov. 5, 2020

(65) Prior Publication Data
US 2022/0002995 A1    Jan. 6, 2022

(30) Foreign Application Priority Data
Apr. 30, 2019    (KR) .................. 10-2019-0050787

(51) Int. Cl.
*E04B 9/00*    (2006.01)
*E04B 9/04*    (2006.01)
(Continued)

(52) U.S. Cl.
CPC .............. *E04B 9/20* (2013.01); *E04B 9/0478* (2013.01); *E04B 9/065* (2013.01); *E04B 9/245* (2013.01); *F16B 5/02* (2013.01); *E04B 9/30* (2013.01)

(58) Field of Classification Search
CPC ..... E04B 9/00; E04B 9/18; E04B 9/20; E04B 9/245; E04B 9/0478; E04B 9/065;
(Continued)

(56) References Cited

U.S. PATENT DOCUMENTS 8,690,222 B2 *   4/2014   Johnson ................ B60N 3/048
                                                        296/97.23
9,260,857 B2 *   2/2016   Hohmann, Jr. ....... E04B 1/7616
(Continued)

FOREIGN PATENT DOCUMENTS

JP       2008-185076 A    8/2008
KR  10-2003-0007092 A    1/2003
(Continued)

OTHER PUBLICATIONS

International Search Report for PCT/KR2020/005687 dated Jul. 27, 2020.

*Primary Examiner* — Chi Q Nguyen
(74) *Attorney, Agent, or Firm* — The PL Law Group, PLLC (57) ABSTRACT

An anchor bolt assembly according to an embodiment of the present disclosure includes an anchor body provided with a plurality of pointed protrusions on an upper surface thereof, an anchor shell provided with open upper and lower sides thereof, extrapolated to a lower side of the anchor body, provided with a first incised part having a "Y" shape at an equal interval along a circumference of the anchor shell, and provided with a second incised part having a "v" shape at an equal interval along a longitudinal direction of the first incised part, a tightening member screwed to the anchor body through a screw thread provided on an inner circumferential surface of the tightening member, and provided with a processing part for increasing frictional force along an upper circumference of the tightening member.

3 Claims, 12 Drawing Sheets

(51) Int. Cl.
  *E04B 9/06* (2006.01)
  *E04B 9/20* (2006.01)
  *E04B 9/24* (2006.01)
  *F16B 5/02* (2006.01)
  *E04B 9/30* (2006.01)

(58) Field of Classification Search
  CPC .... E04B 9/242; E04B 9/30; F16B 5/02; F16B 5/0275; F16B 43/00; F16B 43/001
  See application file for complete search history.

(56) References Cited

U.S. PATENT DOCUMENTS

| | | | | |
|---|---|---|---|---|
| 9,945,414 | B1* | 4/2018 | Rodenhouse | F16B 43/001 |
| 10,202,754 | B2* | 2/2019 | Hohmann, Jr. | E04B 1/4178 |
| 10,968,638 | B1* | 4/2021 | Hohmann, Jr. | E04B 1/4178 |
| 11,698,095 | B1* | 7/2023 | Wigboldy | F16B 23/0007 |
| | | | | 411/371.2 |
| 2003/0213199 | A1* | 11/2003 | Bongio | E04B 9/183 |
| | | | | 52/506.07 |
| 2013/0280013 | A1* | 10/2013 | Gong | F16B 25/0084 |
| | | | | 411/387.1 |
| 2013/0340378 | A1* | 12/2013 | Hohmann, Jr. | E04B 1/4178 |
| | | | | 52/705 |
| 2015/0121792 | A1* | 5/2015 | Spoo | E04B 1/7629 |
| | | | | 52/506.05 |
| 2016/0183638 | A1* | 6/2016 | Lu | F16B 21/073 |
| | | | | 24/581.1 |
| 2018/0283434 | A1* | 10/2018 | Kunken | F16B 13/002 |
| 2021/0140459 | A1* | 5/2021 | Kunken | F16B 5/02 |

FOREIGN PATENT DOCUMENTS

| | | |
|---|---|---|
| KR | 20-0385156 Y1 | 5/2005 |
| KR | 10-2017-0100095 A | 9/2017 |
| KR | 10-2017-0105242 A | 9/2017 |
| KR | 10-2020-0040643 A | 4/2020 |

* cited by examiner

ANCHOR BOLT ASSEMBLY AND CEILING FINISHING PANEL FIXING APPARATUS COMPRISING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/005687, filed Apr. 29, 2020, which claims priority to the benefit of Korean Patent Application No. 10-2019-0050787 filed in the Korean Intellectual Property Office on Apr. 30, 2019, the entire contents of which are incorporated herein by reference.

BACKGROUND

Technical Field

The present invention relates to an anchor bolt assembly and a ceiling finishing panel fixing device including the same and, more particularly, to an anchor bolt assembly and a ceiling finishing panel fixing device including the same, the anchor bolt assembly being configured such that the anchor bolt assembly is easily combined with and fixed to a ceiling slab, a fixing anchor bolt is not removed even by vibration, an anchor body is prevented from spinning in place with no traction during installation, installation time taken due to tightening or loosening action of a tightening member is reduced, an anchor shell is strongly fixed to a wall after the installation, and a lower part of the anchor body is prevented from shaking.

Background Art

In general, a finishing panel is installed on a ceiling of a building to shield a rough ceiling surface of concrete and the like, keep building indoors warm, or prevent electric wiring and the like installed on the ceiling from being exposed.

As the above finishing panel, gypsum board, plywood, gypsum cement ceiling panel, a synthetic resin (i.e., thermosetting resin) decorative ceiling panel, an aluminum finishing panel, a stainless steel finishing panel, and the like are used.

Finishing panels are constructed by installing a separate fixing device on a lower surface part of a ceiling foundation concrete layer of a building, and as for an installation and construction structure of such finishing panels, until recently, various techniques have been proposed and used in various ways.

The existing fixing devices for ceiling finishing panels include: a fixing anchor bolt combined with and fixed to a lower surface part of a ceiling slab; a channel bar screwed to the fixing anchor bolt and arranged at a predetermined interval along one direction; and a panel fixing bar provided with a finishing panel attached to a lower surface part thereof and being arranged at a predetermined interval at an angle of 90 degrees to the channel bar, so as to be coupled to the channel bar.

In this case, conventionally, the finishing panel is bolted with a screw bolt and the like from a lower part thereof and is fixed and attached to the panel fixing bar, but there are problems in that when separating the finishing panel from the panel fixing bar for repair, the separating work is difficult, an exposed screw bolt is not good aesthetically, and when a cover is provided under the finishing panel to cover the exposed screw bolt, the installation is more difficult and time-consuming.

Figure 1:
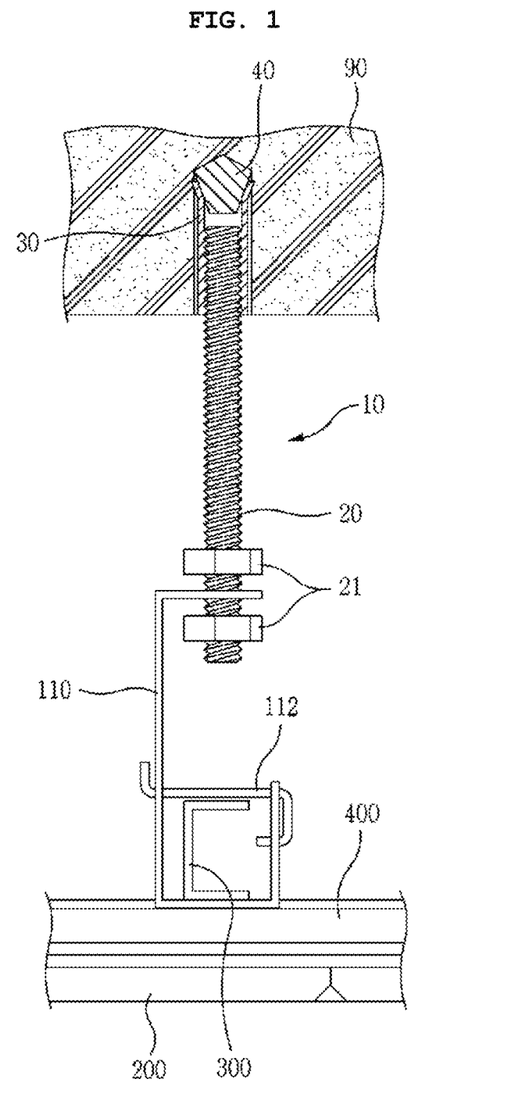
FIG. 1 is a cross-sectional view showing an example of a ceiling finishing panel fixing device of according to the related art.

In addition, as shown in FIG. 1, as the fixing anchor bolt according to the related art, in a case where a strong anchor 10 is used for a finishing panel to be coupled and fixed to a ceiling slab 90, firstly, an installation hole into which the strong anchor 10 may be inserted is formed on the ceiling slab 90, and then the strong anchor 10 provided with a conical wedge 40, a sleeve pipe 30, a full-threaded bolt 20, a nut 21, a hanger 110, and the like is completely assembled.

In such a state, after inserting the conical wedge and the sleeve pipe 30 into the above-described installation hole, when hitting the lower end of the full-threaded bolt 20 with a hammer or the like three to four times, the sleeve pipe 30 is opened around the conical wedge 40 and fixed thereto by an expansion piece (not shown) in close contact with the inner wall of the installation hole, and then, a finishing panel 200 is fixedly installed on both a channel bar 300 and a panel fixing bar 400.

Meanwhile, in the fixing structure of the ceiling slab 90 using such a conventional strong anchor 10, since the above-described expansion piece is opened and is inserted into an inner wall of the installation hole while scratching the inner wall at a time when the sleeve pipe 30 is inserted into the installation hole by hitting, the sleeve pipe 30 does not reach the end of the installation hole, but stops in the middle thereof, whereby there is a risk in that the strong anchor 10 may fall out by vibration and the ceiling itself may collapse.

In addition, there is a problem in that vibration of the hanger 110 is directly transmitted to the strong anchor 10 on the upper side thereof, and in particular, when a full-threaded bolt 20 is long, the full-threaded bolt 20 is bent by vibration or wind pressure, whereby there is a risk in that the ceiling itself may collapse.

As a fixing anchor bolt according to another related art, in a case where a set anchor (not shown) is used, there is a problem of causing cumbersome and inconvenient work when installing the set anchor on a ceiling slab, the problem including: disassembling assembly parts; hitting by application of a hitting pipe; reassembling the disassembled parts; and the like.

That is, when a conventional set anchor is installed on a ceiling slab, the installation requires complicated and time-consuming work in sequence, including:

disassembling a spring washer and a nut from a full-threaded bolt of the set anchor sold on the market; inserting a hitting pipe into the full-threaded bolt; hammering the hitting pipe three to four times with a separate hitting means such as a hammer; fixing the set anchor to a ceiling; separating the hitting pipe from the full-threaded bolt; reinserting the spring washer and nut to the full-threaded bolt; and completely fixing the nut by tightening the nut with a spanner and the like.

SUMMARY

The present invention is devised to solve the problems of the related art, and an objective of the present invention is to provide an improved anchor bolt assembly and a ceiling finishing panel fixing device including the same, the anchor bolt assembly not disassembling assembly parts and easily fixing an anchor body to a ceiling slab without use of tools such as a hammer.

Another objective of the present invention is to provide an improved anchor bolt assembly and a ceiling finishing panel fixing device including the same, the anchor bolt assembly preventing an anchor body from spinning in place with no traction during installation.

Yet another objective of the present invention is to provide an improved anchor bolt assembly and a ceiling finishing panel fixing device including the same, the anchor bolt assembly being able to reduce installation time taken due to tightening or loosening action of a tightening member.

Still another objective of the present invention is to provide an improved anchor bolt assembly and a ceiling finishing panel fixing device including the same, the anchor bolt assembly being provided with an incised part that has a shape of a barb and is drilled into a wall as an expansion piece of an anchor shell is opened, so as to strongly fix the anchor shell to the wall.

Still another objective of the present invention is to provide an improved anchor bolt assembly and a ceiling finishing panel fixing device including the same, the anchor bolt assembly preventing a lower part of an anchor body from shaking through a processing part provided in the tightening member.

Still another objective of the present invention is to provide an improved anchor bolt assembly and a ceiling finishing panel fixing device including the same, the anchor bolt assembly being not bent by vibration or wind pressure even when a full-threaded bolt is long, and not transmitting vibration of a hanger to an upper part of an anchor body.

Still another objective of the present invention is to provide an improved anchor bolt assembly and a ceiling finishing panel fixing device including the same, the anchor bolt assembly reducing time for installation or disassembly of a finishing panel, and being able to improve exterior aesthetic of a ceiling finished with the finishing panel.

In order to achieve the objectives of the present invention described above, there is provided an improved anchor bolt assembly, including: an anchor body provided with a plurality of pointed protrusions on an upper surface thereof; an anchor shell provided with open upper and lower sides thereof, extrapolated to a lower side of the anchor body, provided with a first incised part having a "Y" shape at an equal interval along a circumference of the anchor shell, and provided with a second incised part having a "v" shape at an equal interval along a longitudinal direction of the first incised part; and a tightening member screwed to the anchor body through a screw thread provided on an inner circumferential surface of the tightening member, and provided with a processing part for increasing frictional force along a circumference of an upper end of the tightening member.

In the present invention, there may be provided a double stepped jaw having a side of a "<>" shape, as an outer diameter thereof widens downward from an upper end of the anchor body and then narrows downward again.

In addition, in the present invention, there may be provided a double screw thread formed at a predetermined height from the lower end of the anchor body toward the upper side thereof.

Meanwhile, in order to achieve the objectives of the present invention, there is provided a ceiling finishing panel fixing device, including: an anchor body provided with a plurality of pointed protrusions on an upper surface thereof; an anchor shell provided with open upper and lower sides thereof, extrapolated to a lower side of the anchor body, provided with a first incised part having a "Y" shape at an equal interval along a circumference of the anchor shell, and provided with a second incised part having a "v" shape at an equal interval along a longitudinal direction of the first incised part; a tightening member screwed to the anchor body through a screw thread provided on an inner circumferential surface of the tightening member, and provided with a processing part for increasing frictional force along a circumference of an upper end of the tightening member; a full-threaded bolt having a screw thread provided on an entire outer circumferential surface thereof and having an upper side thereof screwed to the tightening member; an anchor bolt assembly including a hanger screwed to a lower side of the full-threaded bolt; a channel bar coupled to a position between a hanger pin of the hanger and the hanger and arranged at a predetermined interval along one direction; a panel fixing bar arranged at a lower part of the channel bar at a right angle with respect to the channel bar and coupled to the channel bar through a locking clip; and a finishing panel having protrusions formed at a predetermined height from both front and rear sides to an upper side of the finishing panel, having fitting protrusions provided from left and right sides thereof to the upper side of the finishing panel, and being attached to the panel fixing bar to shield a ceiling surface.

In the present invention, there may be provided a ceiling finishing panel fixing device further including a reinforcing pipe that is opened at the top and bottom thereof to prevent the full-threaded bolt from being bent by surrounding the outside of the full-threaded bolt.

In addition, in the present invention, the hanger may be provided with a cushioning material inside the hanger so that the vibration of the hanger may not be transmitted to the upper anchor body.

In addition, in the present invention, a screw bolt may penetrate the panel fixing bar between the finishing panels, and a magnet may be attached to the head part of the screw bolt.

The improved anchor bolt assembly and the ceiling finishing panel fixing device including the same according to the present invention have the following effects.

First, an anchor body may be easily fixed to a ceiling slab without disassembling assembly parts and without using tools such as a hammer.

Second, an anchor body is prevented from spinning in place with no traction during installation through a number of pointed protrusions provided on the upper surface of the anchor body.

Third, even when a tightening member 630 is allowed to be rotated less, the tightening or loosening action is done by means of a double screw thread provided in the anchor body, thereby reducing installation time.

Fourth, as an expansion piece of an anchor shell is opened, an incised part is drilled into a wall in the form of a barb, and the anchor shell is strongly fixed to the wall.

Fifth, it is possible to prevent a lower part of the anchor body from shaking through a processing part having an uneven shape provided in the tightening member.

Sixth, it is possible to prevent a full-threaded bolt from bending due to vibration or wind pressure through a reinforcing pipe, and prevent vibration of a hanger from being transmitted to the upper part of the anchor body through a cushioning material provided inside the hanger.

Seventh, a screw bolt is fixed to a position between adjacent finishing panels, so as to penetrate a panel fixing bar, and a magnet is attached to a head part of the screw bolt so that the head part of the screw bolt is not exposed, thereby reducing the installation or disassembly time for the finished panel, and improving the exterior aesthetic of a finished ceiling.

DETAILED DESCRIPTION

Hereinafter, an improved anchor bolt assembly and a ceiling finishing panel fixing device including the same according to a preferred exemplary embodiment of the present invention will be described in detail.

The terms or words used in this description and claims are not to be construed as being limited to their ordinary or dictionary meanings, and should be interpreted as meanings and concepts corresponding to the technical spirit of the present invention based on the principle that inventors may properly define the concept of a term in order to best describe their invention.

Figure 2:
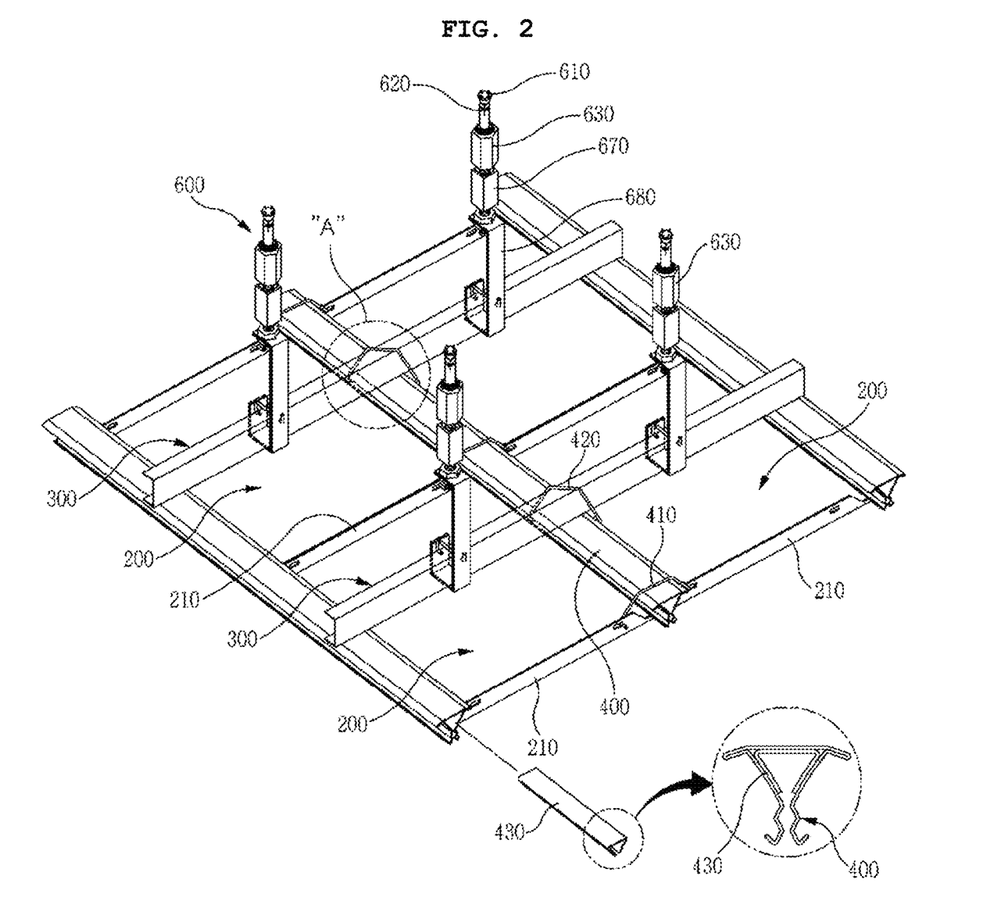
FIG. 2 is a perspective view showing an installed state of a ceiling finishing panel fixing device according to an exemplary embodiment of the present invention.
Figure 3:
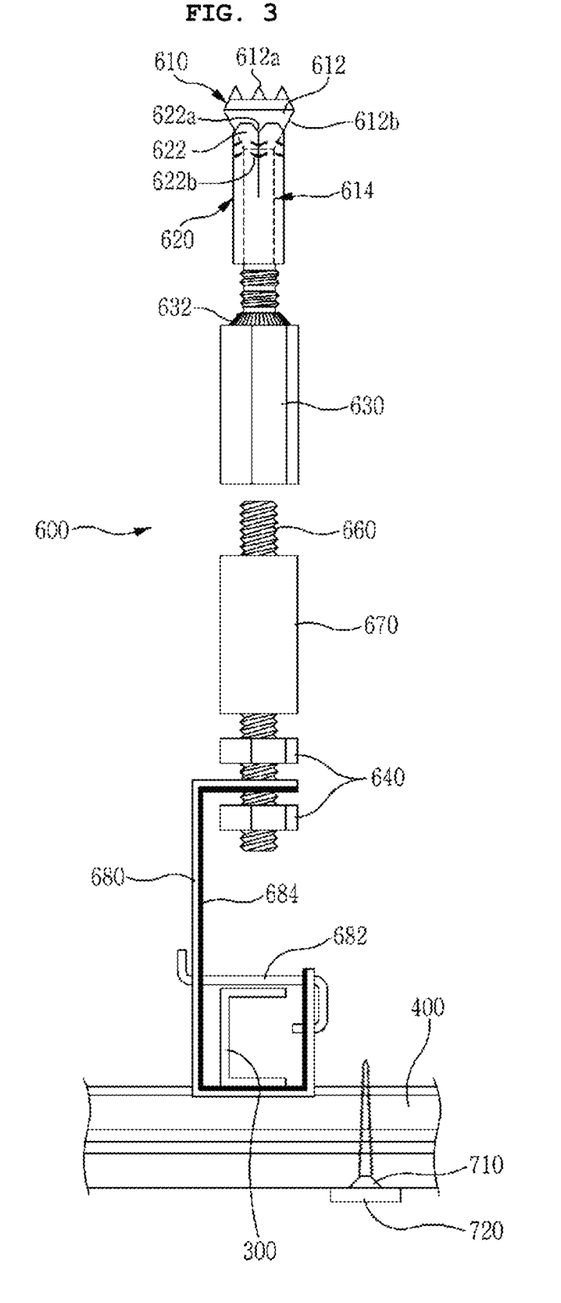
FIG. 3 is a cross-sectional view of the ceiling finishing panel fixing device shown in FIG. 2.
Figure 4:
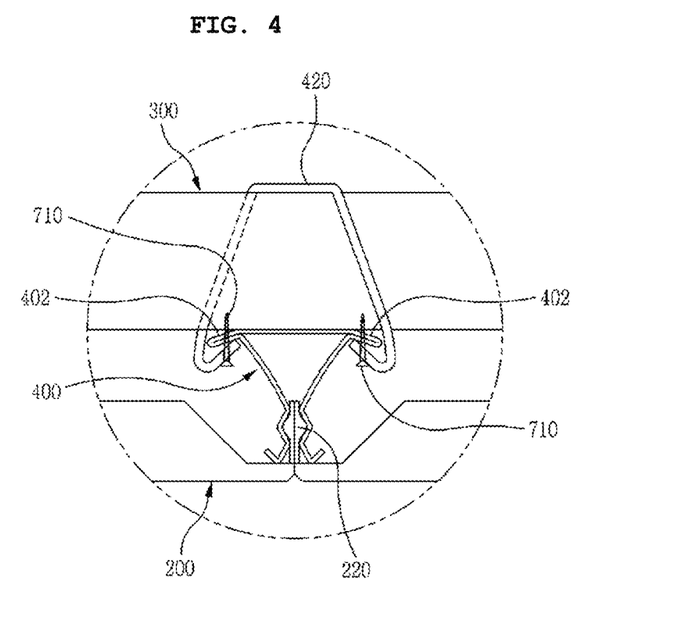
FIG. 4 is an enlarged view showing an "A" part of FIG. 2.

FIG. 2 is a perspective view showing an installed state of a ceiling finishing panel fixing device according to an exemplary embodiment of the present invention, FIG. 3 is a cross-sectional view of the ceiling finishing panel fixing device shown in FIG. 2, and FIG. 4 is an enlarged view showing an "A" part of FIG. 2.

Figure 5:
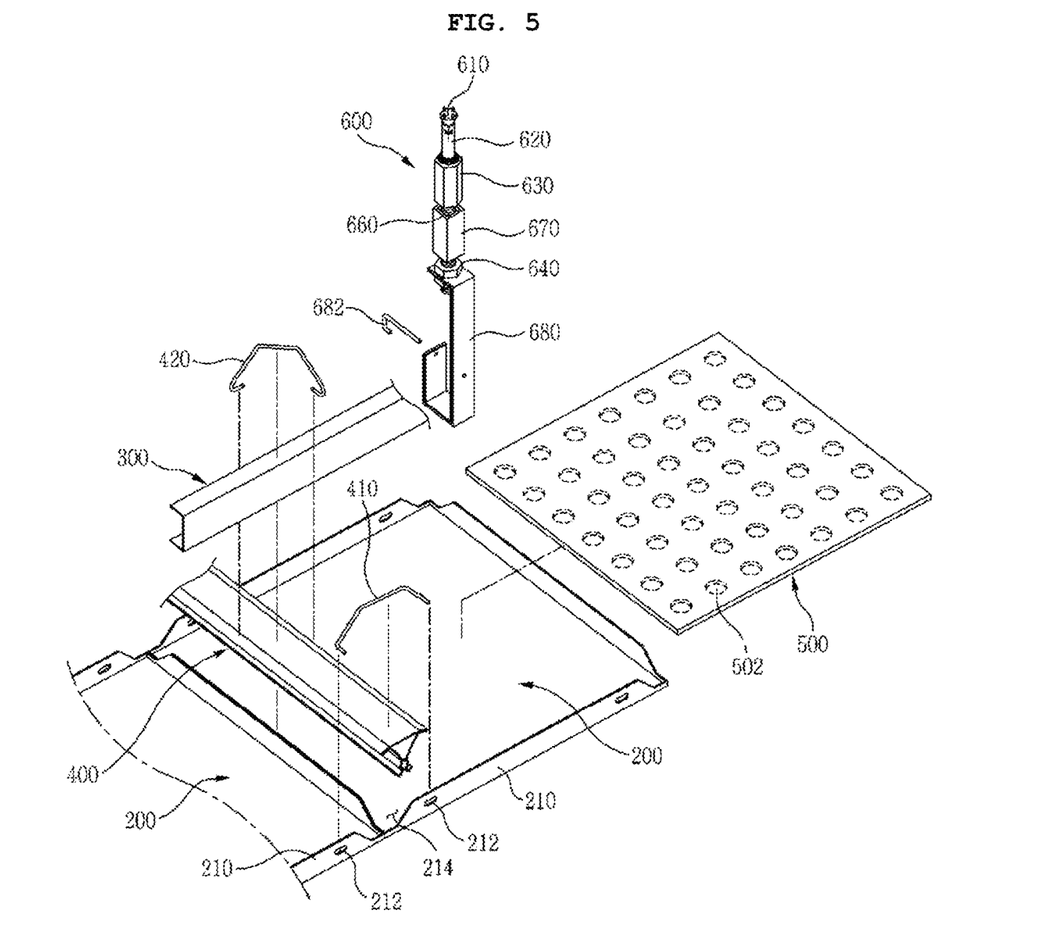
FIG. 5 is a partial exploded perspective view showing the ceiling finishing panel fixing device shown in FIG. 2.
Figure 6:
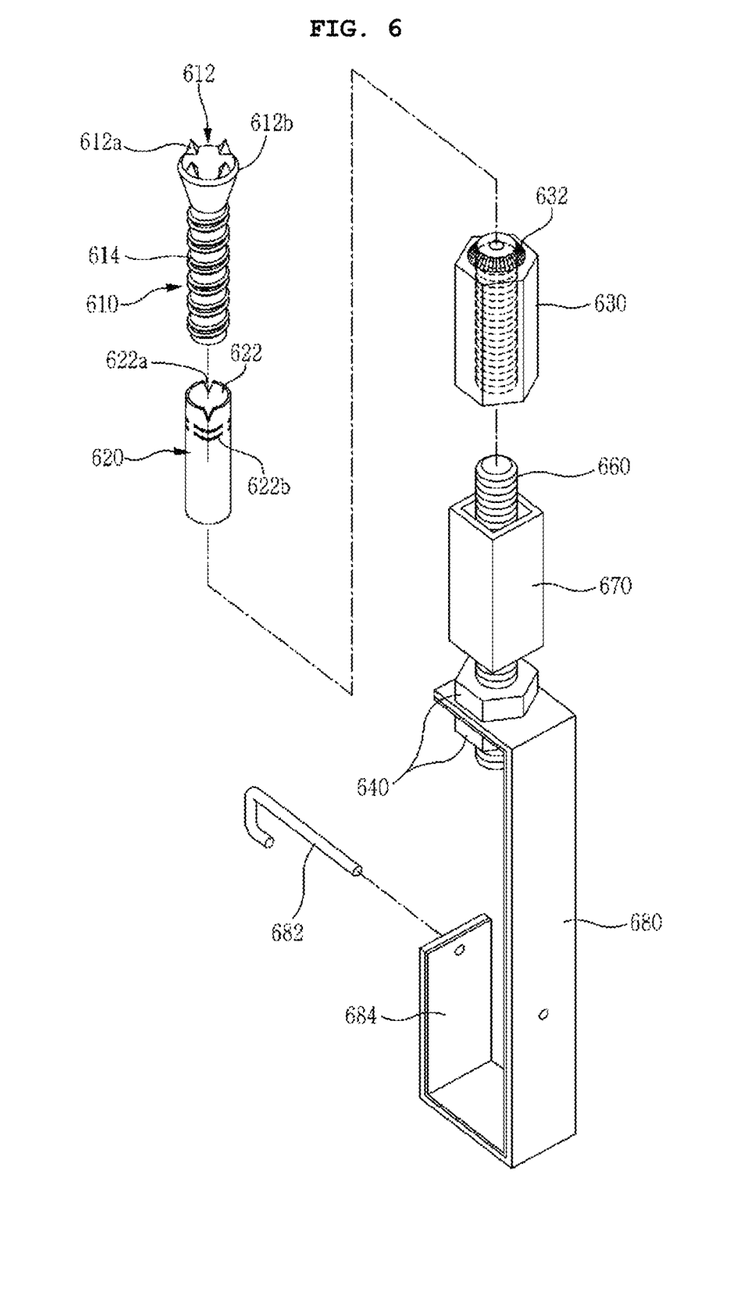
FIG. 6 is an exploded perspective view showing a configuration of an anchor bolt assembly in the ceiling finishing panel fixing device according to the present invention.
Figure 7:
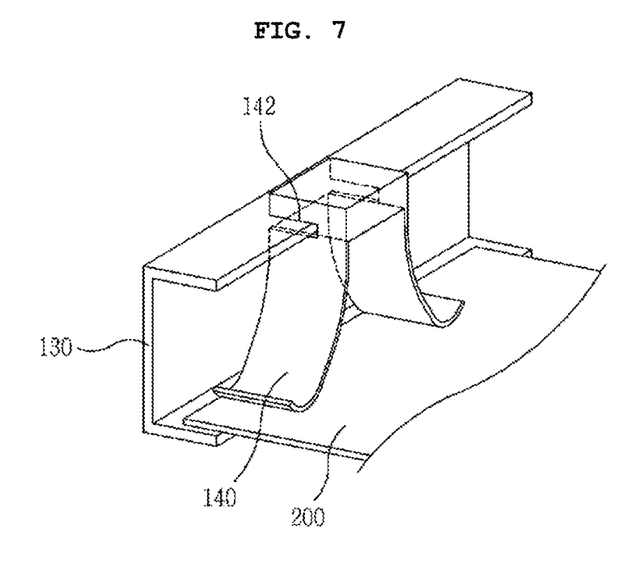
FIG. 7 is a perspective view showing the exemplary embodiment of fixing a finishing panel of the ceiling finishing panel fixing device shown in FIG. 2 to a wall.

FIG. 5 is a partial exploded perspective view showing the ceiling finishing panel fixing device shown in FIG. 2, FIG. 6 is an exploded perspective view showing a configuration of an anchor bolt assembly in the ceiling finishing panel fixing device according to the present invention, and FIG. 7 is a perspective view showing the exemplary embodiment of fixing a finishing panel of the ceiling finishing panel fixing device shown in FIG. 2 to a wall.

Figure 8:
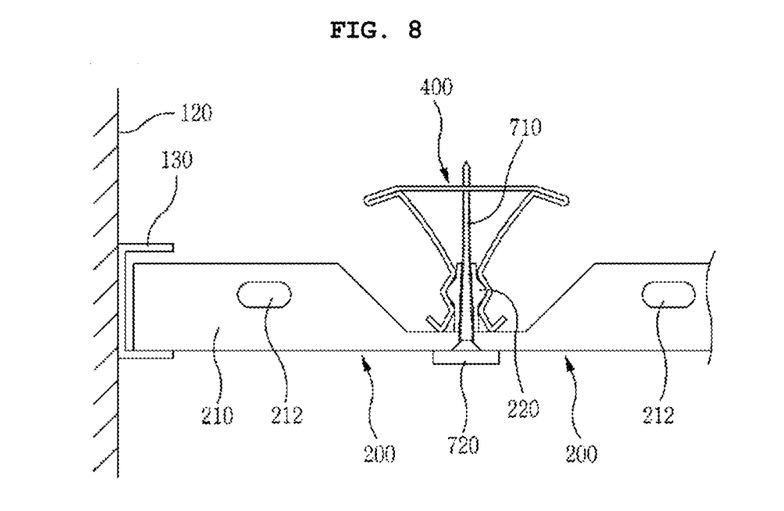
FIG. 8 is a perspective view showing another exemplary embodiment of fixing a finishing panel of the ceiling finishing panel fixing device shown in FIG. 2 to a wall.
Figure 9:
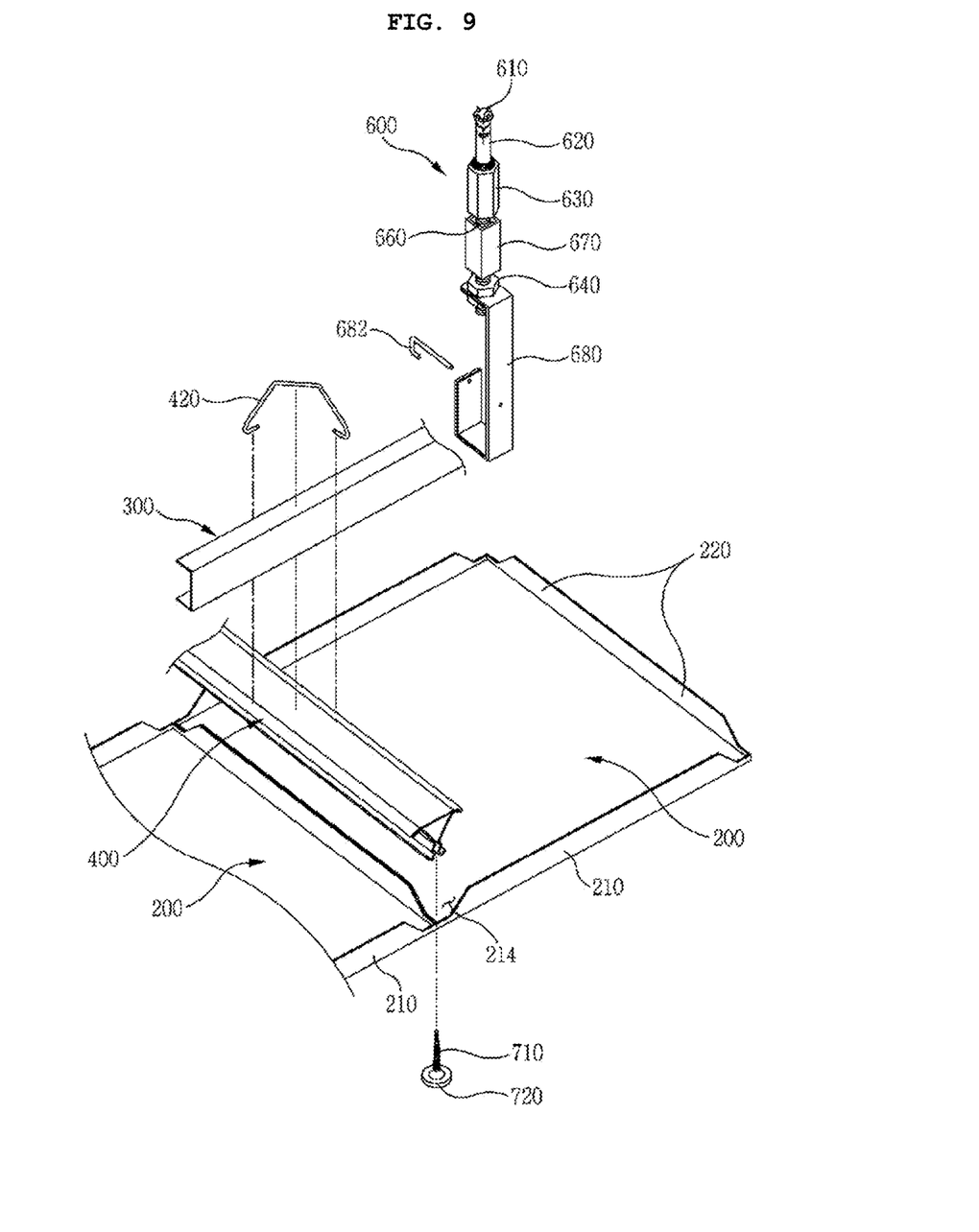
FIG. 9 is a partial exploded perspective view showing the ceiling finishing panel fixing device according to another exemplary embodiment of the present invention.
Figure 10:
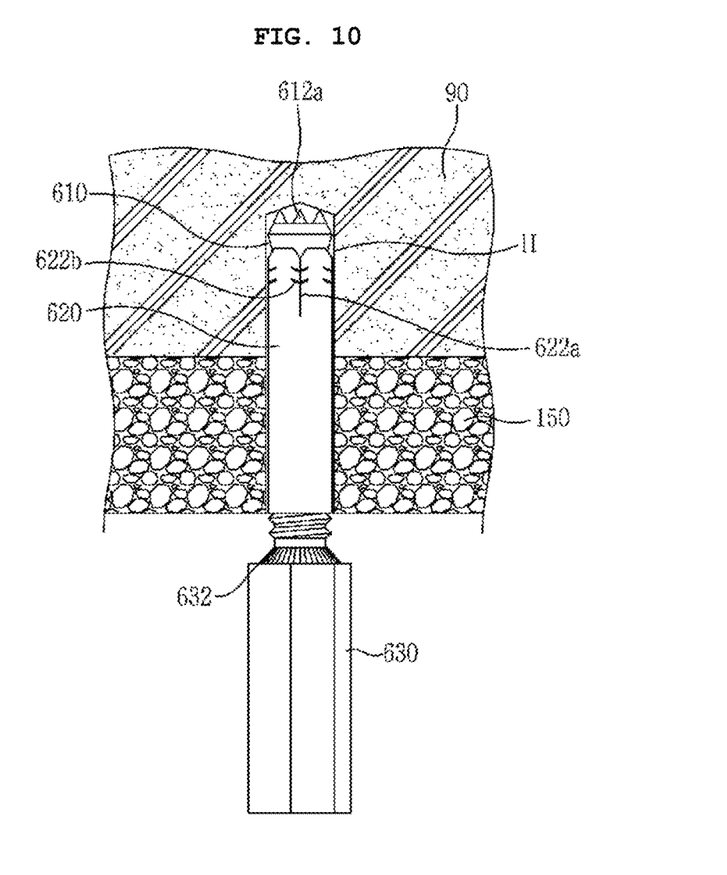
FIGS. 10 and 11 are cross-sectional views showing a use state of the present invention.
Figure 11:
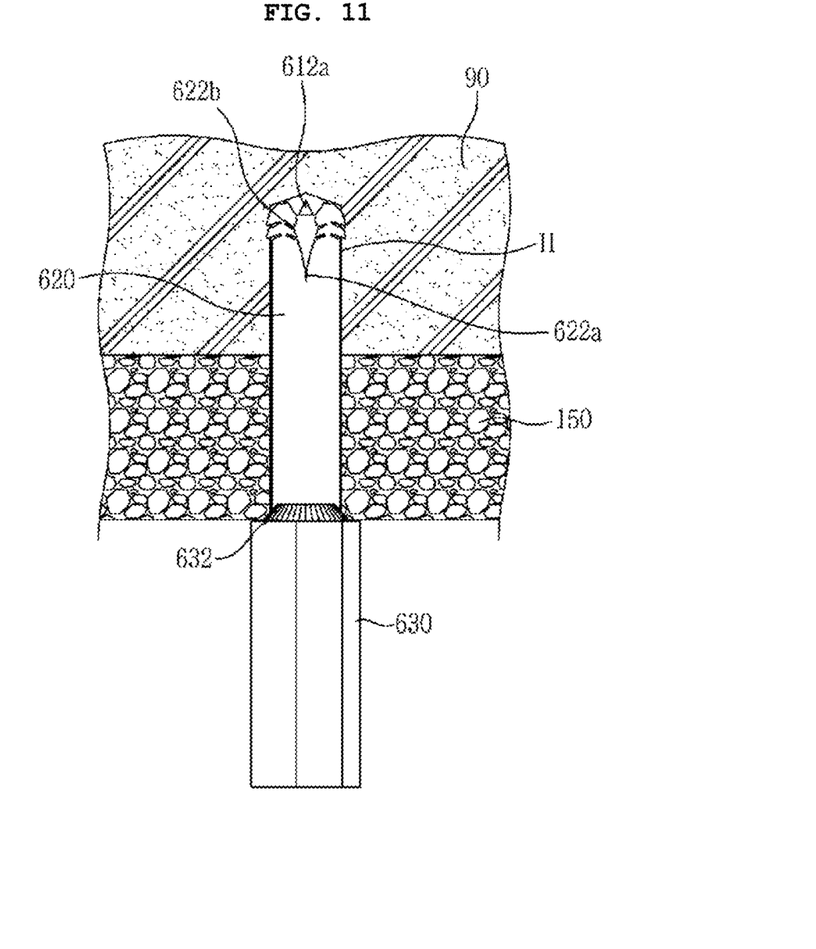
Figure 12:
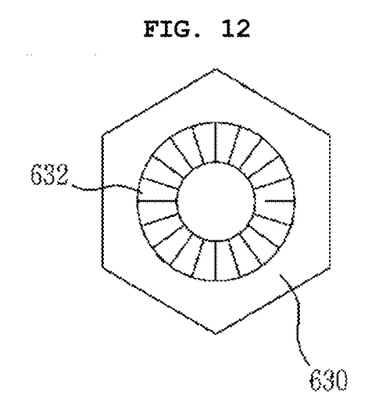
FIG. 12 is a plan view showing a tightening member according to the exemplary embodiment of the present invention.
Figure 13:
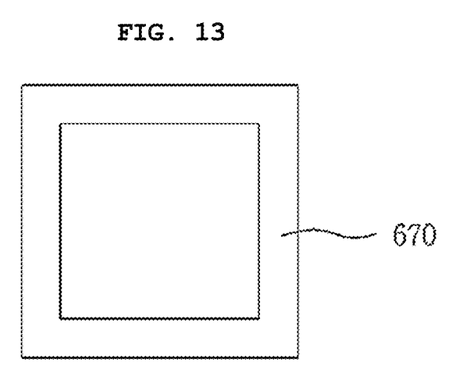
FIG. 13 is a plan view showing a reinforcing pipe according to the exemplary embodiment of the present invention.
Figure 14:
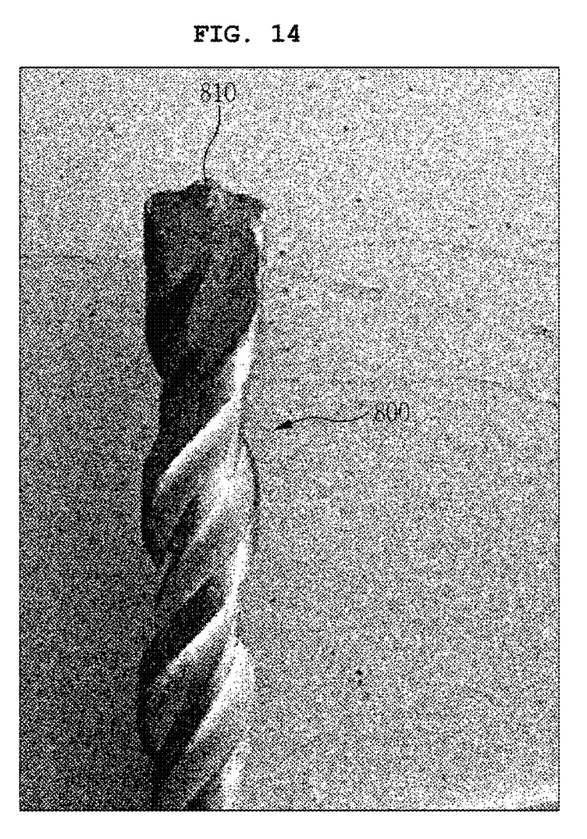
FIG. 14 is a photograph of a hammer drill for forming an installation hole in a ceiling slab in order to fix an anchor bolt assembly to a ceiling according to the exemplary embodiment of the present invention.

In addition, FIG. 8 is a perspective view showing another exemplary embodiment of fixing a finishing panel of the ceiling finishing panel fixing device shown in FIG. 2 to a wall, FIG. 9 is a partial exploded perspective view showing the ceiling finishing panel fixing device according to another exemplary embodiment of the present invention, FIGS. 10 and 11 are cross-sectional views showing a use state of the present invention, FIG. 12 is a plan view showing a tightening member according to the exemplary embodiment of the present invention, FIG. 13 is a plan view showing a reinforcing pipe according to the exemplary embodiment of the present invention, and FIG. 14 is a photograph of a hammer drill for forming an installation hole in a ceiling slab in order to fix an anchor bolt assembly to a ceiling according to the exemplary embodiment of the present invention.

Referring to these views, the ceiling finishing panel fixing device according to the exemplary embodiment of the present invention includes: a finishing panel 200, a channel bar 300, a panel fixing bar 400, and an anchor bolt assembly 600.

First, referring to FIGS. 3 and 6, the anchor bolt assembly 600 has an upper part thereof fixed to a ceiling slab and has a lower part thereof coupled to the channel bar 300 to be described later, and is provided with an anchor body 610 (aka, anchor bolt), an anchor shell 620, a tightening member 630, a full-threaded bolt 660, a reinforcing pipe 670, and a hanger 680.

A plurality of triangular pyramid-shaped protrusions 612*a* is provided on the upper surface of the anchor body 610, is integrated with the anchor body 610 at intervals of 90 degrees, and is formed at a predetermined height, so that the anchor body 610 does not rotate (i.e., so as not to spin in place with no traction) by contacting the interior of the installation hole (H in FIG. 10) of the ceiling slab during installation. Accordingly, when the tightening member 630 to be described later is tightened, the protrusion 612*a* is embedded in the deepest part of the installation hole H of the ceiling slab, thereby preventing the rotation (i.e., a phenomenon of spinning in place with no traction) of the anchor body 610.

In the exemplary embodiment of the present invention, the protrusion 612*a* is shown to have a triangular pyramid shape, but the present invention is not limited thereto, and a protrusion may be used as long as the protrusion has a shape of a pointed tip.

In addition, a double stepped jaw 612*b* having a "<>" shaped side thereof is provided, as an outer diameter thereof widens downward from an upper end of the anchor body 610 provided with the protrusion 612*a* and then narrows downward again. A screw thread for screwing with the tightening member 630 is formed on the lower part of the double stepped jaw 612*b*, that is, on the outer circumferential surface of a trunk part of the anchor body 610.

In addition, a double screw thread 614 is formed at a predetermined height from the lower end of the anchor body 610 toward the upper side thereof, so that even when the tightening member 630 is allowed to be rotated less, tightening or loosening action is done by means of the double screw thread 614, thereby reducing installation time.

The anchor shell 620 is a part having open upper and lower sides thereof, is extrapolated to the lower side of the anchor body 610, and is configured such that first incised parts 622*a* having a "Y" shape are formed at equal intervals along the circumference of the anchor shell 620, and a plurality of second incised parts 622*b* having a "v" shape is formed at equal intervals along the longitudinal direction of the first incised parts 622a so that the plurality of expansion pieces 622 are separated from each other.

That is, each expansion piece 622 is configured to be separated from each other at a predetermined interval by the first incised part 622a and second incised part 622b, so that each expansion piece 622 is opened as the double stepped jaw 612b of the anchor body 610 is inserted into the inner side of the anchor shell 620 by the tightening action of the tightening member 630.

Accordingly, as shown in FIGS. 10 and 11, when the anchor shell 620 is raised toward the deepest part of the installation hole H, the upper pieces of the anchor shell 620 are bent and gathered together toward the triangular pyramid protrusion 612a of the anchor body as each first incised part 622a of the anchor shell 620 is opened in the "◇" shape to the left and right due to the "◇" shape structure of the double stepped jaw 612b of the anchor body 610 and the "○" shape structure of the deepest part of the installation hole H, and in this case, each second incised part 622b of the anchor shell 620 positioned on a side of a wall of the installation hole H has the same shape as a barb, and each barb-shaped part is drilled into the wall of the installation hole H, whereby the anchor shell 620 is strongly fixed to the wall.

Referring to FIG. 14, the "○" shape structure at the deepest part of the installation hole H is thus formed due to the "○" shape of a tip protrusion 810 formed in the center of the tip of a hammer drill 800 for forming an installation hole H.

Accordingly, unlike the related art, by the tightening action of the tightening member 630 without using tools such as a hammer and without disassembling parts constituting an anchor bolt assembly, the anchor bolt assembly may be easily fixed to a ceiling slab, installation time is also reduced, and after the installation, the anchor bolt assembly may be prevented from falling out of the ceiling slab by vibration and the like.

In a case of fixing an anchor body 610 and an anchor shell 620 according to the exemplary embodiment of the present invention to a ceiling slab 90, an upper end of the anchor body 610 is embedded in the ceiling slab 90 by protrusions 612a on the upper end of the anchor body 610, so that when rotating a tightening member 630 to the right with an impact drill (not shown) while pressing the tightening member 630 screwed to the lower side of the anchor body 610, the anchor body 610 is not rotated, but only the anchor shell 620 is opened while the anchor shell 620 is tightened by the tightening member 630, whereby the anchor body 610 and the anchor shell 620 are fixed to the ceiling slab 90.

Referring to FIGS. 6 and 12, the tightening member 630 is generally in the form of a nut and is screwed to the anchor body 610 through a screw thread provided on the inner circumferential surface thereof, and is provided with a processing part 632 formed along a circumference of the upper part of the tightening member 630 in order to increase frictional force. That is, when the tightening member 630 rotates and approaches an installation hole H of the ceiling slab 90, the processing part 632 having an uneven shape closely adheres to the opening of the installation hole H, thereby preventing the lower part of the anchor body 610 from shaking.

The processing part 632 may be configured to have a tooth shape of a knurling or a straight bevel gear.

The full-threaded bolt 660 has a screw thread formed on the entire outer circumferential surface of the bolt having no head part. The upper side of such a full-threaded bolt 660 is screwed to a lower side of the tightening member 630, and a lower side of the anchor body 610 is screwed to an upper side of the tightening member 630.

Referring to FIG. 13, the reinforcing pipe 670 having a square pipe shape is opened at the top and bottom thereof and surrounds the outer side of a full-threaded bolt 660, in particular, the full-threaded bolt 660 having a long length, thereby preventing the full-threaded bolt 660 from bending.

The hanger 680 is screwed to the lower side of the full-threaded bolt 660 by a pair of upper and lower nuts 640 provided in a horizontal bent part of the upper end of the hanger 680, and a lower end part of the hanger 680 is bent in double in the form of a "L"-shaped cross section, thereby being coupled to a channel bar 300 to be described later.

The double bent part of the hanger 680 is provided with a hanger pin 682 inserted horizontally to hold the double bent part, and the channel bar 300 in the form of a "C" shape is combined between the hanger pin 682 and the hanger 680.

Referring to FIGS. 3 to 5, each of the channel bars 300 is arranged long at a regular interval along a single direction on the upper part of each panel fixing bar 400, and is combined to the panel fixing bar 400, so as not to be removed, by a locking clip 420 having opposite ends thereof locked to the panel fixing bar 400.

As shown in FIGS. 3 and 4, the part in which the channel bar 300, the panel fixing bar 400, and the locking clip 420 contact is combined with a screw bolt 710, whereby in the case where the locking clip 420 is removed, the panel fixing bar 400 is prevented from being separated from the channel bar 300.

In addition, a cushioning material 684 is attached to the inside of the hanger 680 to prevent vibration of the hanger from being transmitted to the upper part of the anchor body 610 through other parts.

Referring to FIGS. 2 to 4, the panel fixing bar 400 has a substantially inverted triangle shape, wherein left and right vertices of the upper part of the panel fixing bar 400 respectively have outer edges bent downward in a state where each of the left and right vertices is folded in two layers, so that each bent part of the outer edge is locked by each of the opposite ends of the locking clip 420. In addition, vertex parts having a concave-convex shape at the bottom center of the panel fixing bar 400 are in contact with each other, so that a fitting protrusion 220 formed at each end of adjacent finishing panels 200 is inserted into a position between the vertex parts having the concave-convex shape.

As shown in FIGS. 8 and 9, between the adjacent finishing panels 200, in a state where a screw bolt 710 is coupled to the panel fixing bar 400 so as to pass therethrough, a magnet 720 is placed at (i.e., attached to) a lower part of the screw bolt 710, thereby covering the head part of the screw bolt 710. In this way, it is possible to disassemble and install the finishing panel 200 when replacing a finishing panel 200 easier than when using a conventional cover.

The exterior aesthetic of the ceiling finished with the finishing panel is also improved.

The panel fixing bar 400 is arranged long at a right angle with respect to the channel bar under the channel bar 300 and is coupled to the channel bar 300 through the locking clip 420 as described above. In addition, as shown in FIG. 2, in order to reinforce the panel fixing bar 400, a joint 430 having the same shape as the panel fixing bar, that is, an inverted triangle shape, may be further provided on the inside of the panel fixing bar.

As shown in FIG. 8, the finishing panel 200 attached to the panel fixing bar 400 is made of a non-combustible iron plate, an aluminum plate, a thermosetting resin plate, or a PVC-based plate, wherein protrusions 210 are formed upwardly at a predetermined height on both front and rear sides of the finishing panel 200, and fitting protrusions 220 are formed upwardly on both left and right sides of the finishing panel 200.

The fitting protrusion 220 of the finishing panel 200 has a thick upper part so as not to fall out while being inserted into the position between the vertex parts of the bottom center of the panel fixing bar 400.

As shown in FIGS. 5 and 9, the protrusion 210 is tapered toward the end thereof, so that half grooves 214 in which the panel fixing bar 400 is positioned are formed at left and right ends of the protrusion 210, and one half groove 214 together with the other half groove of an adjacent finishing panel 200 completely form a groove.

Each locking hole 212 with a long length is provided in the protrusion 210, so that one end of a locking clip 410 is locked in a locking hole 212 of one finishing panel 200 in a state where the panel fixed bar 400 is placed on the groove between the adjacent finishing panels 200, and the other end of the locking clip 410 diagonally crosses the upper part of the panel fixing bar 400 and is locked in a locking hole 212 of the other finish panel 200, whereby the finishing panel 200 is attached to the panel fixing bar 400, and accordingly, the locking clip 410 is not exposed at the lower part of the finishing panel 200.

In addition, as shown in FIG. 5, a sound-absorbing material 500 having an insulating material or a sound-absorbing groove 502 formed therein may be coupled to the upper part of the finishing panel 200. The insulating material or sound-absorbing material 500 may be made in a plate shape by combining pulp or nonwoven fabric with recycled paper.

Referring to FIG. 7, when fixing a finishing panel 200 to a ceiling slab, a side end of the finishing panel 200 positioned at the outermost side thereof is fixed to one side wall, and the finishing panel 200 is forwardly fixed to the other side wall by using the above-described device and method.

In the case of reaching the other side wall, when the finishing panel 200 adequately contacts the other side wall, there is no problem, but when the finishing panel 200 manufactured collectively in a predetermined size does not contact the other side wall, the finishing panel 200 must be cut partially and fixed to the other side wall.

When cutting the finishing panel 200 in this case, as shown in FIG. 7, a "C"-shaped molding 130 made of aluminum, PVC, or iron is attached to the wall, and a cut finishing panel 200 is placed on the bottom of the "C"-shaped molding 130, wherein a hold-down clip 140 which is PVC-based and elastic is used and pressed from above to prevent the cut finishing panel 200 from moving.

A slit 142 in FIG. 7 is formed in the hold-down clip 140 to stably press the finishing panel 200 in a state of being fitted on the upper part of the "C"-shaped molding 130.

Referring to FIG. 8, in the case where the finishing panel 200 is not cut, as shown in the view, the "C"-shaped molding 130 made of aluminum is attached to the wall 120 and the finishing panel 200 is inserted into the "C"-shaped molding 130.

Referring to FIG. 9, in a state where the panel fixing bar 400 is seated in the half grooves 214 provided in the protrusion 210 of the finishing panel 200, a screw bolt 710 passes through the panel fixing bar 400, and then a magnet 720 is attached to the screw bolt 710.

Referring to FIGS. 10 and 11, for example, when an insulation material 150 made of Styrofoam material is installed at a lower part of a ceiling slab 90 made of concrete, installation work is performed by fitting an anchor shell 620 longer than the thickness of the insulation material 150 into an anchor body 610 and tightening a tightening member 630. In particular, an anchor bolt assembly 600 made of a material that does not rust is used for the ceiling of an indoor swimming pool, bath, or sauna, which are continuously exposed to moisture.

So far, the improved anchor bolt assembly and the ceiling finishing panel fixing device including the same according to the present invention have been described with reference to the drawings, but the present invention is not limited by the exemplary embodiments and drawings disclosed in the present specification, and obviously, those skilled in the art will appreciate that various substitutions, modifications, and changes are possible within the scope of the technical spirit of the present invention.

The improved anchor bolt assembly and the ceiling finishing panel fixing device including the same according to the present invention is necessary for shielding a rough ceiling surface such as concrete, or for heat insulating the interior of a building, or for finishing a ceiling so that the electric wiring and the like installed on the ceiling is not exposed, and thus the present invention has industrial applicability.

What is claimed is:

1. An anchor bolt assembly comprising:
an anchor body provided with a plurality of pointed protrusions on an upper surface thereof, and provided with a double stepped jaw having a side of a ◇ shape, as an outer diameter thereof widens downward from an upper end of the anchor body and then narrows downward again;
an anchor shell provided with open upper and lower sides thereof, extrapolated to a lower side of the anchor body, provided with a first incised part having a Y shape at an equal interval along a circumference of the anchor shell, and provided with a second incised part having a v shape at an equal interval along a longitudinal direction of the first incised part; and
a tightening member screwed to the anchor body through a screw thread provided on an inner circumferential surface of the tightening member, tightening and allowing the double stepped jaws of the anchor body to be inserted into the anchor shell so as to expand an expansion piece, and provided with a processing part for increasing frictional force along a circumference of an upper end of the tightening member,
wherein the anchor shell is configured to be raised toward a deepest part of an installation hole by the tightening member, due to a structure of the ◇ shape of the double stepped jaw of the anchor body and a structure of a ˆ shape of the deepest part of the installation hole, and, due to the raised anchor shell, the first incised part of the anchor shell is configured to be opened to left and right in a form of ◇ so that an upper part of the anchor shell is bent and gathered toward a triangular pyramid protrusion of the anchor body, and
at this time, the second incised part of the anchor shell positioned on a wall side of the installation hole has a barb shape, and the second incised part is drilled into a wall of the installation hole, thereby strongly fixing the anchor shell to the wall.

2. A ceiling finishing panel fixing device, comprising:
the anchor bolt assembly of claim 1;
a full-threaded bolt having a screw thread provided on an entire outer circumferential surface thereof and having an upper side thereof screwed to the tightening member of the anchor bolt assembly;

a hanger screwed to a lower side of the full-threaded bolt;
a channel bar coupled to a position between a hanger pin of the hanger and the hanger and arranged at a predetermined interval along one direction;
a panel fixing bar arranged at a lower part of the channel bar at a right angle with respect to the channel bar and coupled to the channel bar through a locking clip; and
a finishing panel having protrusions formed at a predetermined height from both front and rear sides to an upper side of the finishing panel, having fitting protrusions provided from left and right sides thereof to the upper side of the finishing panel, and being attached to the panel fixing bar to shield a ceiling surface.

3. The ceiling finishing panel fixing device of claim 2, wherein a screw bolt is fixed through the panel fixing bar between the finishing panel and adjacent finishing panel; and
a magnet is attached to a head part of the screw bolt.

* * * * *